United States Patent Office 3,245,887
Patented Apr. 12, 1966

3,245,887
ELECTRODEPOSITION OF NICKEL
Frank Passal, Detroit, and Warren R. Doty, Clawson, Mich., assignors to M & T Chemicals Inc., New York, N.Y., a corporation of Delaware
No Drawing. Filed Jan. 31, 1963, Ser. No. 255,201
12 Claims. (Cl. 204—49)

This application is a continuation-in-part of copending application Serial No. 8,240 filed February 12, 1960, now abandoned.

The present invention relates to novel compositions of matter useful as additives to nickel plating baths.

An object of this invention is to provide novel compositions of matter.

Another object of this invention is to provide a process for producing novel compositions of matter useful as additives to nickel electroplating baths.

Still another object of this invention is to provide superior baths for electrodepositing bright and smooth nickel.

The invention also contemplates providing a superior method for electrodepositing bright and smooth nickel.

I have discovered that novel substituted pyridine quaternary salts having the following general formula are potent primary brighteners in nickel electroplating baths.

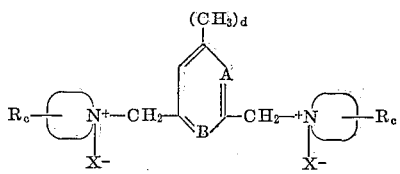

wherein one of the groups A and B is

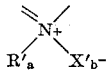

and the other is

$a$, $b$, $c$ and $d$ are each 0 or 1; R and R′ are alkyl groups having 1 to 4 carbon atoms; X and X′ are anions; and

is selected from the group consisting of pyridine, quinoline, and isoquinoline.

These compounds may generally be classified as 2,4-disubstituted pyridine compounds, 2,6-disubstituted pyridine compounds, 2,4-disubstituted-6-picoline compounds and 2,6-disubstituted-4-picoline compounds.

Of the salts of the type encompassed by the general formula, those that are in the doubly quaternized form, i.e., $a$ and $b$ equal 1, are preferred. These double quaternary nitrogen compounds are prepared by reacting the singly quaternized compound containing a tertiary nitrogen atom with an alkylating agent such as dimethyl sulfate. These quaternary compounds may be used per se, or the anionic functional group may be replaced by other anions. These anions are from water-soluble acids or water soluble salts. This is illustrated in the replacement of the chloride anion by the acetate anions; by reacting the chloride-containing quaternary with silver acetate. Among the common anions useful in the invention are bromide, chloride, iodide, sulfate, methosulfate, ethosulfate, chloroacetate, citrate, and percholorate. The iodides, bromides, methosulfates and ethosulfates are preferred because of their solubility and compatibility in the standard nickel plating baths. In the acid nickel plating baths, these quaternized salts are ionized with the active brightening agent being the cation. The active ionized cation which may be present in the plating bath may generally have the formula

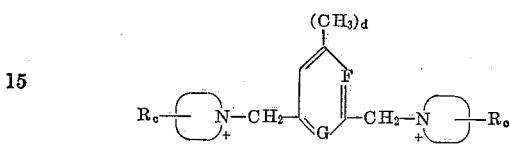

wherein one of the groups F and G is

and the other is

The cation is, obviously, at equilibrium with the various anions in the baths.

The quaternary salts of this invention are prepared by reacting 2,6-lutidine; 2,4-lutidine; or 2,4,6-collidine with the pyridine (or the quinoline or the isoquinoline) in a molar ratio of at least 2 moles of the pyridines per mole of lutidine or collidine in the presence of iodine. The purified product has the general formula

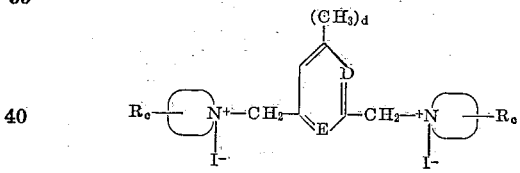

wherein one of the groups D and E is

and the other is

This is preferably quaternized with an alkylating agent such as dimethyl sulfate by heating together and then adding water and boiling to volatilize and hydrolyze the excess of alkylating agent.

Illustrative of the preparation of the substituted pyridine quaternary salts are the following examples:

*Example 1*

At room temperature 10.7 g. of 2,6-lutidine (0.1 mole) and 40 g. of pyridine were mixed and heated to 115° C. under reflux with stirring. 50.8 g. of iodine (0.2 mole) in 100 ml. of dimethyl formamide were added dropwise over a period of 2 hours, during which the temperature increased to 139° C. This temperature was then maintained for another 4 hours, after which the reaction mixture was cooled in ice water to 10° C., filtered, washed with ethyl alcohol and then acetone. The product, α,α'-bis(pyridinium iodide)-2,6-lutidine, was a crystalline material with a melting point of 259–260° C., which is noted as compound A in Table III.

*Example 2*

The doubly quaternized salt of the α,α'-bis(pyridinium iodide)-2,6-lutidine was prepared by adding 37 ml. of dimethyl sulfate to 30.3 g. of the purified product of Example 1. The reaction mixture was warmed slowly to 100° C. and held for one hour. It was then cooled to about 45° C. and 75 ml. of water was added, followed by heating to about 100° C. for one to two hours to decompose excess dimethyl sulfate. The product of this example is present in the final water solution as a cation havign the following formula:

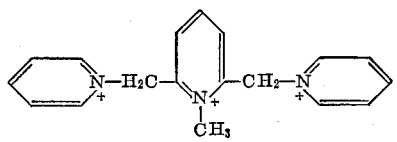

The anions present in the solution, methosulfate, and sulfate, are compatible with the other constituents of nickel plating baths. During the quaternization with the alkylating agent the iodide anion is lost by volatilization as hydriodic acid (HI). The reaction product is noted as compound B in Table III.

*Example 3*

The following were reacted generally according to the procedure of Example 1: 2.7 grams (0.25 mole) of 2,6-lutidine, 12.7 grams (0.05 mole) of iodine, and 30 ml. (0.23 mole) of quinoline were heated to 130–140° C. for 3 hours, then cooled in ice and filtered. The crystals were washed with acetone and recrystallized from ethyl alcohol and water (80% ethanol by volume). The yield was about 10% of α,α' - bis(quinolinium iodide) - 2,6-lutidine, which is noted as compound C in Table III. Melting point greater than 300° C.—dark yellow crystals.

*Example 4*

1.2 g. of the product of Example 3 was slowly heated with 10 ml. of methyl chloracetate. Bubbling began well below 130° C. with the red-colored solid becoming gummy. It was cooled and 10 ml. of ethyl alcohol added, boiled for 10 minutes and then cooled in ice. A red oil separated out. The solvents were removed by vacuum leaving a residue of red needles. 20 ml. of ethyl alcohol were added and the crystals filtered to recover 1 gram. After recrystallization from boiling ethyl alcohol and treatment of the hot solution with activated carbon, the yield was about 0.22 g. of light red needles. Melting point 186–190° C. with partial melting at 128° C. The product is noted as compound D in Table III.

*Example 5*

12.1 g. (0.1 mole) of 2,4,6-collidine was heated to 117° C. in a reaction vessel fitted with a stirrer, reflux condenser and dropping funnel. 50.8 g. iodine (0.2 mole) dissolved in 100 ml. of pyridine was added dropwise over a one-half hour period to the hot collidine; followed by heating for an additional one and one-half hour at 117° C. The reaction mix was cooled to 6° C. and filtered and washed with acetone (50 ml.). Recovery was 34 g. An additional 23.5 g. was recovered from the filtrate after adding more acetone. The product is noted as compound E in Table III.

*Example 6*

10 g. of the product of Example 5 plus 20 ml. dimethyl sulfate was heated slowly to 100° C. and held at this temperature for one hour. It was cooled and 75 ml. of water was added and then boiled until all the dimethyl sulfate decomposed, followed by treatment with 2 g. activated carbon, and filtered. The product is noted as compound F in Table III.

*Example 7*

10.7 g. (0.1 mole) of 2,4-lutidine was placed in a 500 ml. flask fitted with a stirrer, reflux condenser and dropping funnel. 50.4 g. (0.2 mole) of iodine was dissolved in 100 ml. of pyridine and this solution was added dropwise over a period of one hour while stirring and heating the contents of the flask. The temperature was maintained at 119° C. for an additional 2 hours. The mixture was cooled to room temperature and a mass of light brown crystals precipitated. These were filtered, washed with acetone and air dried to give 70 g. of product. After recrystallization, the product was pale reddish brown in color and melted sharply at 167–168° C. Iodine analysis by silver nitrate titration showed 49.1% iodine (theory 49.3%).

Conventional baths and processes for electroplating bright nickel are described in "Principles of Electroplating and Electroforming," Blum and Hogaboom, pages 362–381, revised third edition, 1949, McGraw-Hill Book Co., Inc., New York; and in "Modern Electroplating," edited by A. G. Gray, The Electrochemical Society, 1953, pages 299–355. The control and operating conditions, including the concentration of the bath ingredients, pH, temperature, current density, etc., of these conventional baths are generally applicable to the present invention. Almost all baths for electroplating bright nickel contain nickel sufate, a choride, usually nickel chloride; a buffering agent, usually boric acid; and a wetting agent, e.g., sodium lauryl sulfate, sodium lauryl ether sulfate, or 7 - ethyl - 2 - methyl - 4 - undecanol sulfate. Such baths include the well-known Watts bath and the high chloride bath. Other baths may contain as a source of the nickel a combination of nickel fluoborate with nickel sulfate and nickel chloride, or a combination of nickel fluoborate with nickel chloride. Typical Watts-type baths and high chloride baths are noted in Tables I and II.

TABLE I.—WATTS-TYPE BATHS

| | |
|---|---|
| Nickel sulfate, g./l. | 200 to 400 |
| Nickel chloride, g./l. | 30 to 75 |
| Boric acid, g./l. | 30 to 50 |
| Temperature, ° C. | 30 to 65 |
| pH (electrometric) | 2.5 to 4.5 | with agitation.

TABLE II.—HIGH CHLORIDE BATHS

| | |
|---|---|
| Nickel chloride, g./l. | 150 to 300 |
| Nickel sulfate, g./l. | 40 to 150 |
| Borice acid, g./l. | 30 to 50 |
| Temperature, ° C. | 30 to 65 |
| pH (electrometric) | 2.5 to 4.5 | with agitation.

Addition agents as brighteners in bright nickel plating baths are divided into two classes on the basis of their function. "Secondary brighteners" (1) increase the brightness of an ordinarily dull or matte deposit but not to a full or mirror bright stage and (2) impart a ductilizing effect. The use of "primary brighteners" in conjunction with secondary brighteners results in mirro-bright deposits.

The pyridine quaternary salts of the present invention are potent and extremely effective primary brighteners. The following specific salts are preferred, as are the baths containing the cationic residue of the salts:

TABLE III

A. α,α'-bis(pyridinium iodide)-2,6-lutidine
B. α,α'-bis(pyridinium)-1-methyl-2,6-lutidinium trimethosulfate
C. α,α'-bis(quinolinium iodide)-2,6-lutidine TABLE III—Continued D. α,α'-bis(quinolinium-1-methylcarboxymethyl)-2,6-lutidinium trichloride
E. bis(pyridinium iodide)-2,4,6-collidine
F. bis(pyridinium)-1-methyl-2,4,6-collidine trimethosulfate
G. α,α'-bis(picolinium iodide)-2,6-lutidine
H. α,α'-bis(pyridinium chloride)-2,6-lutidine
I. α,α'-bis(pyridinium)-1-ethyl-2,6-lutidinium triethosulfate
J. α,α'-bis(4-ethylquinolinium iodide)-2,6-lutidine
K. α,γ-bis(pyridinium iodide)-2,4-lutidine
L. α,γ-bis(pyridinium)-1-methyl-2,4-lutidinium trimethosulfate
M. α,γ-bis(quinolinium iodide)-2,4-lutidine
N. α,γ-bis(pyridinium)-1-(methylcarboxymethyl)-2,4-lutidinium trichloride
O. α,γ-bis(picolinium iodide)-2,4-lutidine
P. α,γ-bis(pyridinium chloride)-2,4-lutidine
Q. α,γ-bis(pyridinium)-1-ethyl-2,4-lutidinium triethosulfate
R. α,γ-bis(4-ethylquinolinium iodide)-2,4-lutidine These pyridine quaternary salts are generally used in concentrations between 0.01 g./l. and 0.1 g./l., the particular preferred concentrations depend on the secondary brightener used, its concentration, and such other factors as the degree of luster, rate of brightening and leveling desired, and the finish of the basis metal.

Secondary brighteners which are useful in combination with the primary brighteners, generally in amounts between 1 g./l. up to 75 g./l., and preferably 1 g./l. to 20 g./l., include such substituted aromatic compounds as 1,3,6-naphthalene trisulfonate, sodium or potassium salts of saccharin, the sodium or potassium salts of ortho-sulfobenzaldehyde, the water soluble aryl sulfonic acid and sulfinic acid compounds, etc. For use in high chloride type nickel plating baths, a preferred secondary brightener is a sodium or potassium salt of sulfonated dibenzothiophene dioxide, prepared by sulfonating diphenyl with fuming sulfuric acid and isolating and neutralizing the reaction product. The preferred secondary brighteners for use with the primary brighteners of the present invention are the sodium and potassium salts of saccharin, sulfonated dibenzothiophene dioxide, and sodium 1,3,6-naphthalene trisulfonate. The secondary brighteners are generally characterized by having at least one sulfone or sulfonic acid group attached to a nuclear carbon. In addition to the usual brightener system of a primary brightener and a secondary brightener, the system may also contain an auxiliary secondary brightener such as 2-butene-1,4-diol; or N-vinyl-2-pyrrolidone; or sodium 2-propene-1-sulfonate; or sodium 3-chloro-2-butene sulfonate; or the mixed isomers of sodium 3-butene-2-hydroxy-1-sulfonate and sodium 3-butene-1-hydroxy-2-sulfonate; or sodium 2-propyne-1-sulfonate; or sodium 1-phenylethene-2-sulfonate.

For the purpose of giving those skilled in the art a better understanding of the invention, illustrative examples are given. In each of the examples, an aqueous acidic nickel-containing bath was made up with the specified components. Electrodeposition of nickel was carried out by passing electric current through an electric circuit comprising an anode and sheet metal or rod cathode, both immersed in the bath. The baths were agitated, usually by a moving cathode. Bright electrodeposits were obtained in all the tests included herein as examples.

In Examples 1 through 16, the following standard bath was used as a base solution:

| | G./l. |
|---|---|
| Nickel sulfate | 300 |
| Nickel chloride | 60 |
| Boric acid | 45 |
| Sodium lauryl sulfate | 0.5 |

The primary brightener is identified from Table III.

TABLE IV

| Example No. | Additives | Amt., g./l. | A./sq. dm. C. D. | pH | Temp., °C. |
|---|---|---|---|---|---|
| 1 | Saccharin (as K salt) | 4 | 4.0 | 4.3 | 60 |
|   | Primary Brightener A | 0.02 | | | |
| 2 | Saccharin (as K salt) | 4 | 4.0 | 3.8 | 62 |
|   | Primary Brightener B | 0.04 | | | |
| 3 | Saccharin (as K salt) | 4 | 4.0 | 4.0 | 54 |
|   | Primary Brightener C | 0.05 | | | |
| 4 | Saccharin (as K salt) | 4 | 4.0 | 4.0 | 54 |
|   | Primary Brightener D | 0.05 | | | |
| 5 | Saccharin (as K salt) | 4 | 4.0 | 4.0 | 60 |
|   | Primary Brightener E | 0.04 | | | |
| 6 | Saccharin (as K salt) | 4 | 4.0 | 4.3 | 60 |
|   | Primary Brightener F | 0.04 | | | |
| 7 | Saccharin (as K salt) | 4 | 4.0 | 4.3 | 60 |
|   | Primary Brightener M | 0.02 | | | |
| 8 | Saccharin (as K salt) | 4 | 4.0 | 3.5 | 57 |
|   | Primary Brightener B | 0.04 | | | |
| 9 | Sulfonated dibenzothiophene dioxide. | 4 | 4.0 | 3.2 | 54 |
|   | Primary Brightener C | 0.04 | | | |
| 10 | Sulfonated dibenzothiophene dioxide. | 4 | 4.0 | 3.5 | 54 |
|   | Saccharin (as K salt) | 2 | | | |
|   | Primary Brightener A | 0.02 | | | |
| 11 | Saccharin (K salt) | 4 | 4.0 | 4.2 | 60 |
|   | 2-butene-1,4-diol | 0.2 | | | |
|   | Primary Brightener B | 0.04 | | | |
| 12 | Saccharin (as K salt) | 4 | 4.0 | 4.0 | 60 |
|   | Coumarin | 0.2 | | | |
|   | Primary Brightener B | 0.04 | | | |
| 13 | Saccharin (as K salt) | 4 | 4.0 | 4.0 | 60 |
|   | Phenylpropiolamide | 0.2 | | | |
|   | Primary Brightener B | 0.04 | | | |
| 14 | o-Sulfobenzaldehyde (Na salt) | 3 | 4.0 | 3.5 | 60 |
|   | Primary Brightener B | 0.02 | | | |
| 15 | o-Sulfobenzaldehyde (Na salt) | 3 | 4.0 | 3.5 | 54 |
|   | Saccharin (as K salt) | 2 | | | |
|   | Primary Brightener B | 0.02 | | | |
| 16 | Saccharin (as K salt) | 4 | 4.0 | 4.3 | 57 |
|   | 2-butene-1,4-diol | 0.2 | | | |
|   | Phenylpropiolamide | 0.2 | | | |
|   | Primary Brightener D | 0.02 | | | |

In Examples 17 to 21 inclusive, the following standard bath was used as a base solution:

| | G./l. |
|---|---|
| Nickel chloride | 250 |
| Nickel sulfate | 45 |
| Boric acid | 45 |
| Sodium lauryl sulfate | 0.5 |

TABLE V

| Example No. | Additives | Amt., g./l. | A./sq. dm. C. D. | pH | Temp., °C. |
|---|---|---|---|---|---|
| 17 | Saccharin (as K salt) | 4 | 4.0 | 4.0 | 54 |
|   | Primary Brightener A | 0.02 | | | |
| 18 | Saccharin (as K salt) | 4 | 4.0 | 4.0 | 60 |
|   | Primary Brightener B | 0.06 | | | |
| 19 | Saccharin (as K salt) | 4 | 4.0 | 4.0 | 60 |
|   | Primary Brightener M | 0.02 | | | |
| 20 | Sulfonated dibenzothiophene dioxide. | 4 | 4.0 | 3.5 | 57 |
|   | Primary Brightener A | 0.02 | | | |
| 21 | Sulfonated dibenzothiophene dioxide. | 4 | 4.0 | 3.5 | 57 |
|   | Primary Brightener B | 0.02 | | | |

The foregoing examples illustrate specific baths and processes, several being preferred. It is understood that the compositions and conditions may be varied. Although the potassium salts were most often used and are preferred, they may be partially or completely replaced by such other salts as the sodium salts, etc.

The nickel electrodeposits obtained from baths utilizing the novel brightener combination are advantageous in that mirror-bright lustrous electrodeposits having a high degree of ductility are obtained over a wide range of current densities. The bright nickel electrodeposits are preferably plated on a copper or copper alloy basis metal. However, they may be electrodeposited directly on such metals as iron, steel, etc.

As many embodiments of this invention may be made without departing from the spirit and scope thereof, it is to be understood that the invention includes all such modifications and variations as come within the scope of the appended claims.

We claim:
1. A process for electroplating mirror-bright nickel comprising electrodepositing nickel from an aqueous acid nickel electroplating bath containing a secondary brightener and a small effective amount of a primary brightener to cause the electrodeposition of mirror-bright nickel, said primary brightener being a cation having the structure

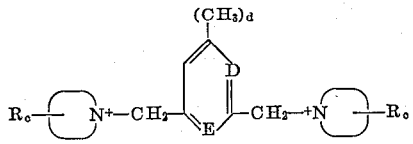

wherein one of the groups D and E is

and the other is

$c$ and $d$ are each 0 to 1; R is an alkyl of 1 to 4 carbon atoms; and

is selected from the group consisting of pyridine, quinoline and isoquinoline.

2. A process for electroplating mirror-bright nickel comprising electrodepositing nickel from an aqueous acid nickel electroplating bath containing a secondary brightener and a small effective amount of a primary brightener to cause the electrodeposition of mirror-bright nickel, said primary brightener being a cation having the structure

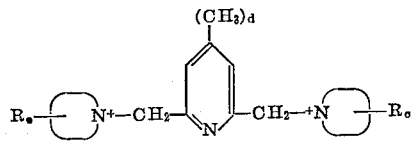

wherein $c$ and $d$ are each 0 to 1; R is an alkyl group having 1 to 4 carbon atoms; and

is selected from the group consisting of pyridine, quinoline and isoquinoline.

3. A process for electroplating mirror-bright nickel comprising electrodepositing nickel from an aqueous acid nickel electroplating bath containing a secondary brightener and a small effective amount of a primary brightener to cause the electrodeposition of mirror-bright nickel, said primary brightener being a cation having the structure

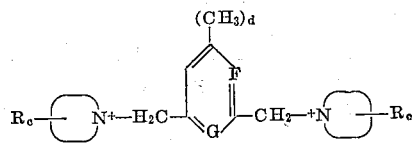

wherein one of the groups F and G is

and the other is

$a$, $c$ and $d$ are each 0 to 1; R and R' are each alkyls of 1 to 4 carbon atoms; and

is selected from the group consisting of pyridine, quinoline, and isoquinoline.

4. A process for electroplating mirror-bright nickel comprising electrodepositing nickel from an aqueous acid nickel electroplating bath containing a secondary brightener and a small effective amount of a primary brightener to cause the electrodeposition of mirror-bright nickel, said primary brightener being a cation having the structure

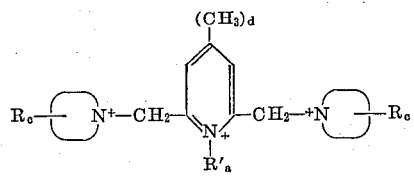

wherein $a$, $c$ and $d$ are each 0 to 1; R and R' are each selected from the class consisting of alkyl groups having 1 to 4 carbon atoms; and

is selected from the group consisting of pyridine, quinoline, and isoquinoline.

5. A process for electroplating mirror-bright nickel comprising electrodepositing nickel from an aqueous acid nickel electroplating bath containing between 1 g./l. and 75 g./l. of a secondary brightener characterized by having at least one group selected from sulfone and sulfonic acid groups attached to a nuclear carbon of a homocyclic aromatic ring and between 0.01 g.l. and 0.1 g.l. of a primary brightener, said primary brightener being a cation having the structure

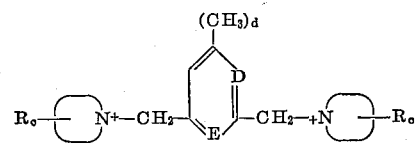

wherein one of the groups D and E is

and the other is

$c$ and $d$ are each 0 to 1; R is an alkyl of 1 to 4 carbon atoms; and

is selected from the group consisting of pyridine, quinoline and isoquinoline.

6. A process for electroplating mirror-bright nickel comprising electrodepositing nickel from an aqueous acid nickel electroplating bath containing between 1 g./l. and 75 g./l. of a secondary brightener characterized by having at least one group selected from sulfone and sulfonic acid groups attached to a nuclear carbon of a homocyclic aromatic ring and between 0.01 g./l. and 0.1 g./l. of a primary brightener, said primary brightener being a cation having the structure

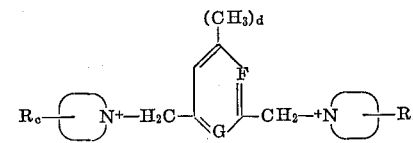

wherein one of the groups F and G is

and the other is

$a$, $c$ and $d$ are each 0 to 1; R and R' are each alkyls of 1 to 4 carbon atoms; and

is selected from the group consisting of pyridine, quinoline and isoquinoline.

7. An aqueous acid electrolytic bath containing soluble nickel salts for the electrodeposition of mirror-bright nickel, containing a secondary brightener and between 0.01 g./l. and 0.1 g./l. of a primary brightener, said primary brightener being a cation having the structure

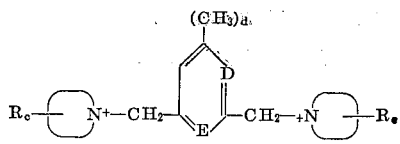

wherein one of the groups D and E is

and the other is

$c$ and $d$ are each 0 to 1; R is an alkyl of 1 to 4 carbon atoms; and

is selected from the group consisting of pyridine, quinoline and isoquinoline.

8. An aqueous acid electrolytic bath containing soluble nickel salts for the electrodeposition of mirror-bright nickel, containing a secondary brightener and between 0.01 g./l. and 0.1 g./l. of a primary brightener, said primary brightener being a cation having the structure

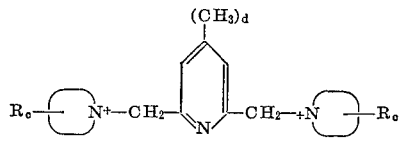

wherein $c$ and $d$ are each 0 to 1; R is an alkyl group having 1 to 4 carbon atoms; and

is selected from the group consisting of pyridine, quinoline and isoquinoline.

9. An aqueous acid electrolytic bath containing soluble nickel salts for the electrodeposition of mirror-bright nickel, containing a secondary brightener and between 0.01 g./l. and 0.1 g./l. of a primary brightener, said primary brightener being a cation having the structure

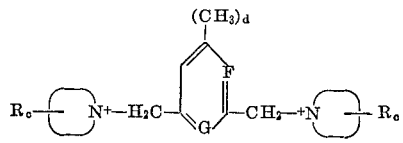

wherein one of the groups F and G is

and the other is

$a$, $c$ and $d$ are each 0 to 1; R and R' are each alkyls of 1 to 4 carbon atoms; and

is selected from the group consisting of pyridine, quinoline, and isoquinoline.

10. An aqueous acid electrolytic bath containing soluble nickel salts for the electrodeposition of mirror-bright nickel, containing a secondary brightener and between 0.01 g./l. and 0.1 g./l. of a primary brightener, said primary brightener being a cation having the structure

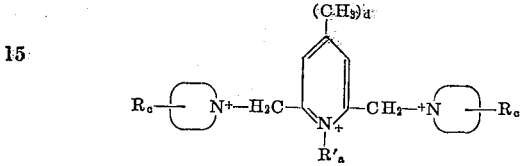

wherein $a$, $c$ and $d$ are each 0 to 1; R and R' are each selected from the class consisting of alkyl groups having 1 to 4 carbon atoms; and

is selected from the group consisting of pyridine, quinoline, and isoquinoline.

11. An aqueous acid electrolytic bath containing soluble nickel salts for the electrodeposition of mirror-bright nickel, containing between 0.01 g./l. and 0.1 g./l. of a primary brightener, said primary brightener being a cation having the structure

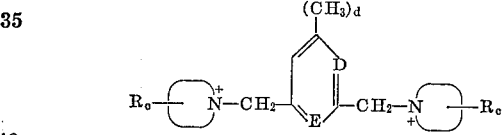

wherein one of the groups D and E is

and the other is

$c$ and $d$ are each 0 to 1; R is an alkyl of 1 to 4 carbon atoms; and

is selected from the group consisting of pyridine, quinoline and isoquinoline; and between 1 g./l. and 20 g./l. of a secondary brightener selected from the class consisting of the sodium and potassium salts of saccharin, sulfonated dibenzothiophene dioxide, and 1,3,6-naphthalene trisulfonate.

12. An aqueous acid electrolytic bath containing soluble nickel salts for the electrodeposition of mirror-bright nickel, containing between 0.01 g./l. and 0.1 g./l. of a primary brightener, said primary brightener being a cation having the structure

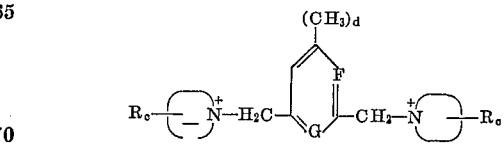

wherein one of the groups F and G is

and the other is

$a$, $c$ and $d$ are each 0 to 1; R and R' are each alkyls of 1 to 4 carbon atoms; and

is selected from the group consisting of pyridine, quinoline, and isoquinoline; and between 1 g./l. and 20 g./l. of a secondary brightener selected from the class consisting of the sodium and potassium salts of saccharin, sulfonated dibenzothiophene dioxide, and 1,3,6-naphthalene trisulfonate.

References Cited by the Examiner

UNITED STATES PATENTS

| | | | |
|---|---|---|---|
| 2,644,789 | 7/1953 | Shenk | 204—49 |
| 2,678,316 | 5/1954 | Harris | 260—290 |
| 2,782,153 | 2/1957 | DuRose et al. | 204—49 |
| 2,889,329 | 6/1959 | Luvisi | 260—290 |
| 2,898,338 | 8/1959 | Vellani | 260—290 |
| 3,000,799 | 9/1961 | Towle | 204—49 |
| 3,008,883 | 11/1961 | Passal | 204—49 |

JOHN H. MACK, *Primary Examiner.*

MURRAY TILLMAN, *Examiner.*

A. B. CURTIS, G. KAPLAN, *Assistant Examiners.*